United States Patent
Ishida

(10) Patent No.: US 9,628,653 B2
(45) Date of Patent: Apr. 18, 2017

(54) IMAGE FORMING APPARATUS PROVIDED WITH A FACSIMILE PORTION

(71) Applicant: KYOCERA Document Solutions Inc., Osaka (JP)

(72) Inventor: Takayuki Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/941,414

(22) Filed: Nov. 13, 2015

(65) Prior Publication Data

US 2016/0150097 A1     May 26, 2016

(30) Foreign Application Priority Data

Nov. 25, 2014  (JP) .................................. 2014-237559

(51) Int. Cl.
  *H04N 1/00*   (2006.01)
(52) U.S. Cl.
  CPC ............................. *H04N 1/00891* (2013.01)
(58) Field of Classification Search
  None
  See application file for complete search history.

(56) References Cited

U.S. PATENT DOCUMENTS

| | | | | |
|---|---|---|---|---|
| 9,329,812 | B2* | 5/2016 | Oba | ....................... G06F 3/1221 |
| 2006/0218440 | A1 | 9/2006 | Inoue | ............................... 714/12 |
| 2013/0223603 | A1* | 8/2013 | Nakazawa | ........... H04N 1/0001 |
| | | | | 379/100.01 |
| 2016/0036596 | A1* | 2/2016 | Fukushima | ............. H04L 12/12 |
| | | | | 370/241 |

FOREIGN PATENT DOCUMENTS

JP        2006-309731 A       11/2006

\* cited by examiner

*Primary Examiner* — Thomas D Lee
(74) *Attorney, Agent, or Firm* — Stein IP, LLC

(57) ABSTRACT

An image forming apparatus includes: a facsimile portion that transmits and receives data through a telephone line with an outside; a power supply portion that supplies power to the facsimile portion; and a power-saving control portion that is connected to a communication line other than the telephone line and that controls a power supply mode of the power supply portion. When the power supply mode is an off mode, the power supply portion stops the supply of power to the facsimile portion. When a connection state determination portion determines that the connection to the telephone line is disconnected, the power-saving control portion controls a transfer to the off mode based on whether or not a notification of information for making a determination on the transfer to the off mode is provided from an information output device connected to the image forming apparatus through the communication line.

14 Claims, 12 Drawing Sheets

IMAGE FORMING APPARATUS PROVIDED WITH A FACSIMILE PORTION

This application is based upon and claims the benefit of priority from the corresponding Japanese Patent Application No. 2014-237559 filed on Nov. 25, 2014, the entire contents of which are incorporated herein by reference.

BACKGROUND

The present disclosure relates to an image forming apparatus that includes a facsimile portion connected to a telephone line and a communication system that includes such an image forming apparatus.

Conventionally, various types of systems are proposed that are connected to a network and that control, according to a specific protocol from the network, transfer to a power-saving mode and the return to a normal mode in a device. Here, the normal mode refers to a mode in which power is supplied to the individual portions of the device and thus it is possible to achieve a predetermined function (for example, in an image forming apparatus, a copying function), and the power-saving mode refers to a mode in which the supply of power to part of the device is stopped and thus power consumption is reduced as compared with the normal mode.

For example, a network device is known that includes: a setting means which sets return conditions corresponding to a protocol followed by a data packet received through a network and used for returning a device from a power-saving mode; and a return means which returns, when a data packet following a specific protocol is received, the network device from the power-saving mode under the return conditions set by the setting means. The network device is intended to provide, even when a user is not a skilled person, a more significant power-saving effect with consideration given to a protocol followed by data received through the network so as to cope with a problem in which unnecessary packet reception increases the number of times the network device is returned from the power-saving mode to inhibit the function of the power-saving mode and a problem in which in a conventional network power-saving control technology, operations such as the selection of a protocol type are complicated and excessively technical such that it is difficult for the user to understand them.

Incidentally, in recent years, the form has been increased in which a multi-function peripheral called a so-called MFP (Multi-Functional Peripheral) having functions such as a copying, a facsimile, a scanner and a printer is connected to a network such as an Ethernet (registered trademark) or a wireless LAN (Wireless Local Area Network) and is utilized. In such a multi-function peripheral, a network control portion called a NIC (Network Interface Controller) is connected to the network and is operated, and thus it is possible to monitor whether or not data transmission from the network to the own multi-function peripheral is performed. Hence, in the power-saving mode, power is supplied to at least the network control portion, and when data transmission from the network to the own multi-function peripheral is performed, it is possible to return the multi-function peripheral to the normal mode.

In a multi-function peripheral having a facsimile function (facsimile portion), the following configuration is generally adopted: as described above, data transmitted from the network is received in the network control portion, and thus the multi-function peripheral is returned to the normal mode, and in addition, even when a call signal (ringer signal) is received in the facsimile portion through a telephone line which is a separate communication line from the network, the multi-function peripheral is returned to the normal mode. In other words, in general, in the power-saving mode, the multi-function peripheral described above stops the supply of power to the main circuit (for example, a CPU; Central Processing Unit) of the facsimile portion, and can detect only the reception of the call signal with the minimum required power.

On the other hand, nowadays, environmental regulations for power saving are tightened, and when the facsimile portion (for example, a circuit board where circuits on facsimile communication are collected) is not connected to a telephone line, it is required to detect the fact thereof and rapidly transfer the power-saving mode to a mode (for convenience, this mode is referred to as an "off mode") in which the supply of power to the entire facsimile portion is stopped and thus power consumption is lowered. As a situation in which the facsimile portion is not connected to a telephone line, for example, a case (modular line disconnection) where a modular line connected to the telephone line is intentionally disconnected by a user from the main body of the multi-function peripheral can be assumed. Whether or not the facsimile portion is connected to the telephone line can be determined through the detection of a line voltage applied to the telephone line by the facsimile portion. For example, when 0V is detected as the line voltage, it is possible to determine that the connection to the telephone line is disconnected.

However, even when a power failure temporarily occurs in a switching station connected to the telephone line or even when the multi-function peripheral is connected to the telephone line through a private branch exchange within a building, and a power failure temporarily occurs in the private branch exchange (hereinafter also referred to as a "power failure in a switching station or the like"), the line voltage detected by the facsimile portion of the multi-function peripheral is 0V, and this state is the same as that of the modular line disconnection. Hence, when a power failure in a switching station or the like is determined to be a modular line disconnection, and thus in order to satisfy the requirement of the environmental regulation described above, the multi-function peripheral is easily transferred to the off mode, at the time of recovery from the power failure in the switching station or the like, it is impossible to detect an incoming call (the reception of a call signal) from the telephone line (because in the off mode, the supply of power to the entire facsimile portion is stopped), with the result that it is impossible to detect an incoming call to return to the normal mode. Under these conditions, after the recovery from the power failure, it is impossible to transmit and receive data in the facsimile portion.

Hence, preferably, when the connection to the telephone line is disconnected, the cause of the line disconnection, that is, whether or not the line disconnection occurs without the intention of the user as in a power failure in a switching station or the like is appropriately determined, and the transfer to the off mode is controlled.

Conventionally, no technology is available in which in a configuration including a facsimile portion, when the connection to a telephone line is disconnected, the cause of the line disconnection is appropriately determined, and thus the transfer to the off mode is controlled.

SUMMARY

An image forming apparatus according to one aspect of the present disclosure includes: a facsimile portion that transmits and receives data through a telephone line with an outside; a power supply portion that supplies power to the facsimile portion; and a power supply control portion that is connected to a communication line other than the telephone line and that controls a power supply mode of the power supply portion, where when the power supply mode is a normal mode, the power supply portion supplies power to the facsimile portion whereas when the power supply mode is an off mode, the power supply portion stops the supply of power to the facsimile portion, the facsimile portion includes a connection state determination portion that determines, based on a line voltage applied to the telephone line, a state of connection between the telephone line and the facsimile portion and when the connection state determination portion determines that the connection to the telephone line is disconnected, the power supply control portion controls a transfer to the off mode based on whether or not a notification of information for making a determination as to whether or not the transfer to the off mode is needed is provided from an information output device connected to the image forming apparatus through the communication line.

A communication system according to another aspect of the present disclosure includes an image forming apparatus and an information output device, where the image forming apparatus includes: a facsimile portion that transmits and receives data through a telephone line with an outside; a power supply portion that supplies power to the facsimile portion; and a power supply control portion that is connected to a communication line other than the telephone line and that controls a power supply mode of the power supply portion, when the power supply mode is a normal mode, the power supply portion supplies power to the facsimile portion whereas when the power supply mode is an off mode, the power supply portion stops the supply of power to the facsimile portion, the facsimile portion includes a connection state determination portion that determines, based on a line voltage applied to the telephone line, a state of connection between the telephone line and the facsimile portion, when the connection state determination portion determines that the connection to the telephone line is disconnected, the power supply control portion controls a transfer to the off mode based on whether or not a notification of information for making a determination as to whether or not the transfer to the off mode is needed is provided from the information output device connected to the image forming apparatus through the communication line and the information output device can output, to the image forming apparatus through the communication line, the information for making a determination as to whether or not the transfer to the off mode is needed in the image forming apparatus.

Further features and advantages of the present disclosure will become apparent from the disclosure of embodiments given below.

DETAILED DESCRIPTION

An embodiment of the present disclosure will be described below with reference to drawings. A description will be given below using a multi-function peripheral 100 as an example of an image forming apparatus. However, elements such as configurations and arrangements that are described in the form of the present embodiment do not limit the scope of the present disclosure, and are simply illustrative examples.

(Schematic Configuration of Multi-Function Peripheral)

Figure 1:
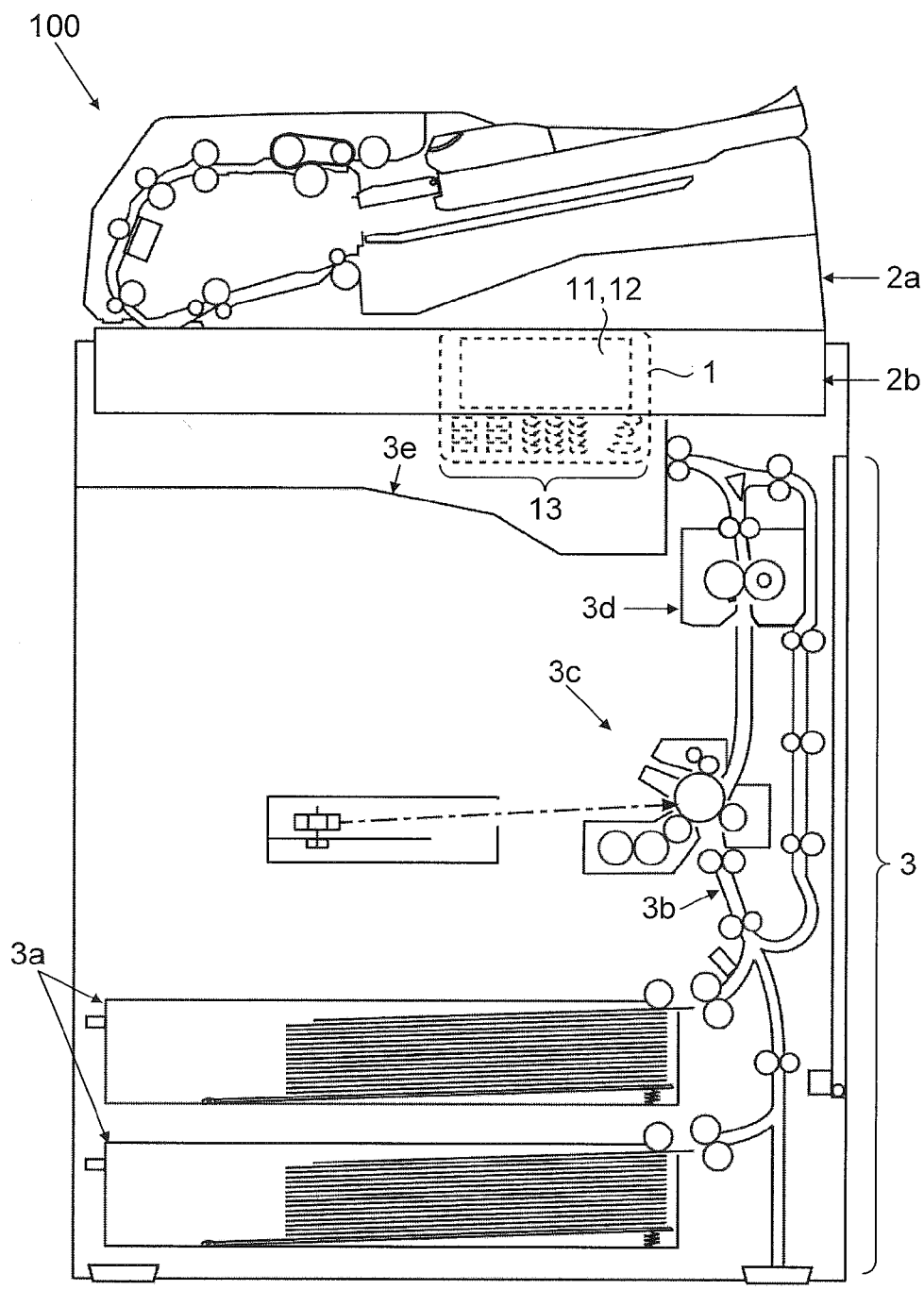
FIG. 1 is an illustrative diagram showing an example of the configuration of a multi-function peripheral serving as an image forming apparatus according to an embodiment of the present disclosure.

FIG. 1 is an illustrative diagram showing an example of the configuration of the multi-function peripheral 100. The multi-function peripheral 100 includes an operation panel 1 (indicated by broken lines in the figure) in the front surface. In an upper portion of the multi-function peripheral 100, an original document transport portion 2a and an image reading portion 2b are provided. Within the multi-function peripheral 100, an image formation mechanism 3 (a paper feed portion 3a, a transport portion 3b, an image formation portion 3c and a fixing portion 3d) for forming an image on a sheet is provided.

The operation panel 1 includes a display portion 11 that displays the state of the multi-function peripheral 100, a message and a setting screen. In the display portion 11, a touch panel portion 12 is provided. The touch panel portion 12 receives an input operation (touch) on the screen and detects the position of a part of the display portion 11 that is pressed and the coordinates thereof. Based on an output of the touch panel portion 12, a button or a soft key operated (pressed) is recognized. In the operation panel 1, a plurality of hard keys 13 such as a start key and a numeric keypad are also provided. In the operation panel 1, a panel control portion 10 (see FIG. 2) is provided that recognizes, based on an output of the touch panel portion 12, a soft key or a hard key 13 which is operated and that controls the display of the display portion 11.

The original document transport portion 2a continuously and automatically transports original documents set one by one to a feed reading contact glass (a reading position which is not shown). The image reading portion 2b reads the original document passing through the feed reading contact glass and the original document set on a placement reading contact glass (not shown), and generates image data.

In the paper feed portion 3a of the image formation mechanism 3, a plurality of sheets are stored. In an example shown in FIG. 1, two paper feed cassettes are provided as the paper feed portion 3a. When a print job is performed, any one of the paper feed cassettes feeds the sheets one by one to the transport portion 3b. The transport portion 3b transports the sheet supplied from the paper feed portion 3a. The image formation portion 3c forms a toner image on a photosensitive member based on the image data, and transfers the toner image to the transported sheet. The fixing portion 3d fixes the toner image transferred to the sheet. The sheet after the fixing of the toner is ejected to an ejection tray 3e.

(Hardware Configuration of Multi-Function Peripheral)

Figure 2:
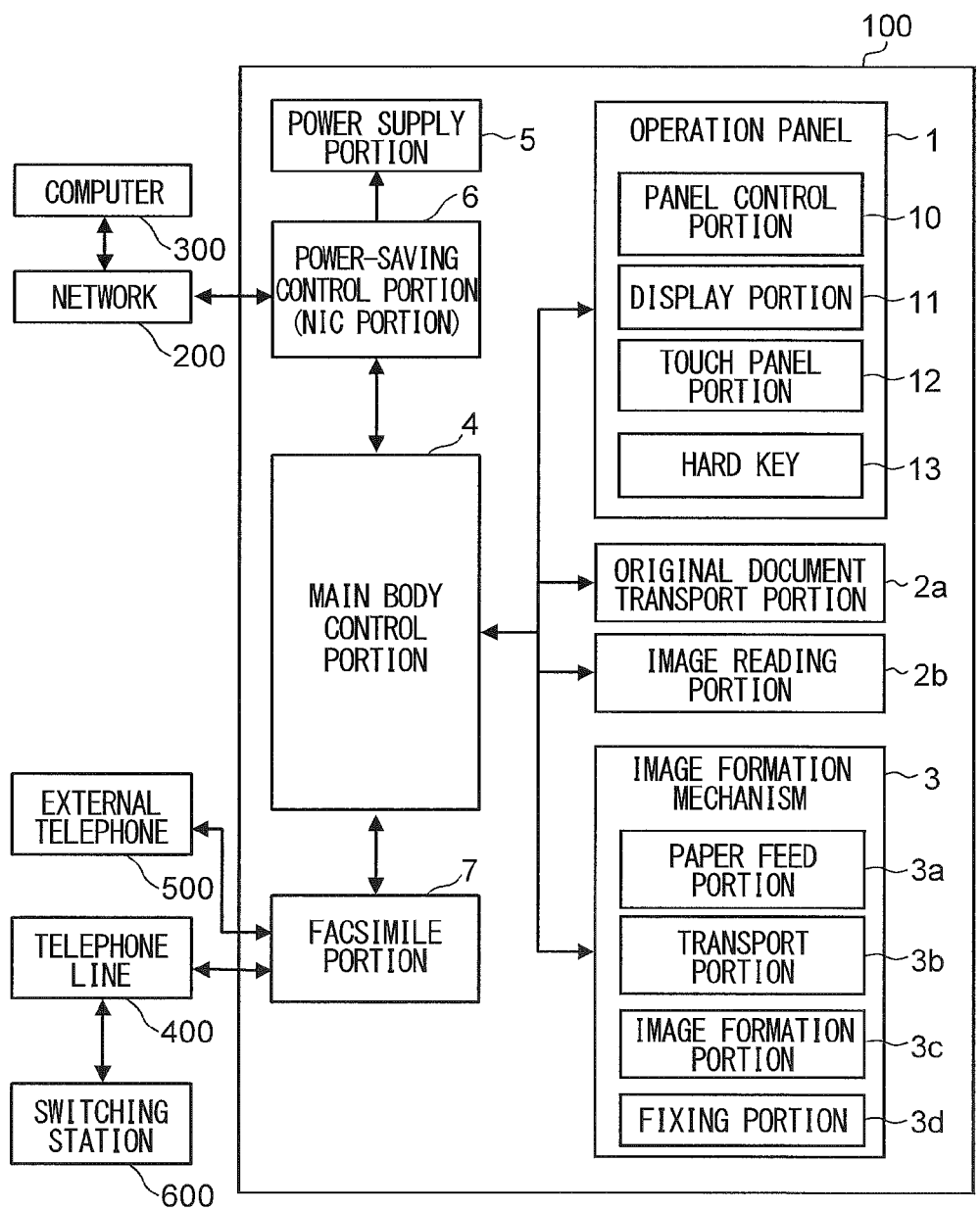
FIG. 2 is a block diagram showing an example of the hardware configuration of the multi-function peripheral.

The hardware configuration of the entire multi-function peripheral 100 will then be described. FIG. 2 is a block diagram showing an example of the hardware configuration of the multi-function peripheral 100. Within the multi-function peripheral 100, a main body control portion 4, a power supply portion 5, a power-saving control portion 6 and a facsimile portion 7 are provided.

The main body control portion 4 is formed by combining a control circuit board, various types of elements, circuits and the like, and controls the individual portions of the multi-function peripheral 100. For example, an image formation operation by the image formation mechanism 3 is controlled by the main body control portion 4.

The power supply portion 5 is connected to, for example, a commercial power supply. Within the power supply portion 5, a plurality of circuits and elements (not shown) such as a rectification circuit, a step-up transformer and a DC/DC converter are arranged, and various types of voltages are generated. For example, a motor drive voltage (for example, DC 24V) for rotating various types of rotation members such as the photosensitive member within the image formation portion 3c and a direct-current voltage (for example, 5V or 3.3V) for driving the main body control portion 4 are generated. The voltage generated in the power supply portion 5 is supplied to individual portions within the multi-function peripheral 100. In other words, power necessary for driving is supplied from the power supply portion 5 to the individual portions within the multi-function peripheral 100.

Here, as the power supply modes of the power supply portion 5, there are a normal mode, a power-saving mode and an off mode. The normal mode is a mode in which power is supplied to the individual portions within the multi-function peripheral 100 to operate the portions. In the normal mode, normal operations such as image formation are performed. The power-saving mode is a mode in which power is supplied to only part of the multi-function peripheral 100 and the supply of power to the other parts is stopped, and thus power saving is achieved as compared with the normal mode. For example, when a predetermined time has elapsed after the completion of the image formation operation in the normal mode, the power supply mode is transferred from the normal mode to the power-saving mode, and thus it is possible to perform power saving on standby. The off mode is a mode in which the supply of power to the individual portions within the multi-function peripheral 100 is stopped, and thus power saving is further achieved as compared with the power-saving mode, and is a mode which has the most significant power-saving effect.

The power-saving control portion 6 is a power supply control portion that controls the power supply modes of the power supply portion 5 described above. Specifically, the power-saving control portion 6 controls the power supply portion 5 according to the state of use of the multi-function peripheral 100 to transfer the power supply mode to any one of the normal mode, the power-saving mode and the off mode.

The power-saving control portion 6 is connected to a network 200 (for example, an Ethernet or a wireless LAN) which is a communication line other than a telephone line 400 to be described later, and also functions as a network control portion (NIC) to, for example, transmit and receive data with an external computer 300 (for example, a personal computer or a server). In this way, it is possible to receive image data and a specific protocol through the network 200 and to transmit the status information of the multi-function peripheral 100 to the outside through the network 200. Based on the reception of the image data and the specific protocol from the network 200, the power supply mode can be transferred from the power-saving mode to the normal mode.

In order to realize, in the power-saving mode, a function of monitoring the specific protocol from the network 200 and a function of feeding out the status information through the network 200, it is necessary that a MAC (Media Access Controller) portion connected to the network 200 be operated. Without these network functions being stopped, power consumption in the power-saving mode can be minimized, and thus it is possible to improve the power saving in the multi-function peripheral 100. Hence, in the present embodiment, a circuit configuration in which the network control portion and the power-saving control portion 6 are integral is adopted, and in the power-saving mode, power is also supplied to the power-saving control portion 6, and the supply of power to the other portions (for example, the main body control portion 4 and the facsimile portion 7 other than a line control portion 71) is stopped. In this way, with necessary network functions available in the power-saving mode, it is possible to minimize the power consumption of the multi-function peripheral 100. Furthermore, when it is detected that the connection to the network 200 is disconnected, for example, that a network cable is not connected, the supply of power to the power-saving control portion 6 which also serves as the network control portion is stopped, with the result that it is possible to enter a state of lower power consumption (off mode).

The facsimile portion 7 transmits and receives data with the outside through the telephone line 400 and a switching station 600 connected thereto. Here, the data to be transmitted and received in the facsimile portion 7 is data on points, lines and the like that form characters, graphics, pictures and the like. An external telephone 500 is connected to the telephone line 400 through the facsimile portion 7. Hence, the telephone line 400 is shared, and thus it is possible to use the external telephone 500 to perform a phone call and to use the facsimile portion 7 to transmit and receive data. The external telephone 500 is preferably a device that is externally provided to the multi-function peripheral 100 (as an option) and that can communicate with the facsimile portion 7 through a communication line (regardless of a wired line or a wireless line) other than the telephone line 400, and may be a fixed-line phone, a mobile telephone or another communication device.

(Detailed Configuration of Main Portion)

Figure 3:
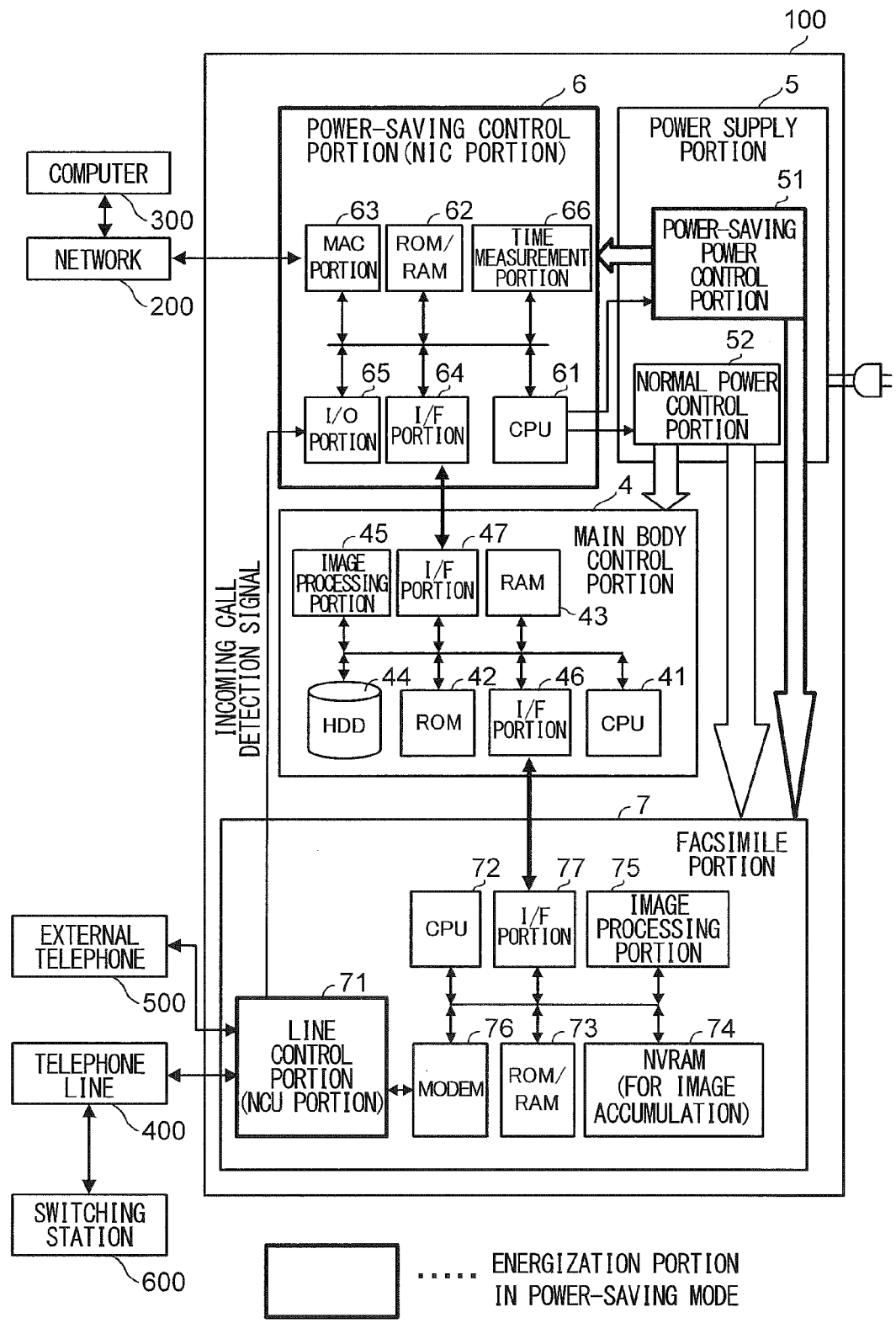
FIG. 3 is a block diagram showing the configuration of a main potion of the multi-function peripheral.

The main body control portion 4, the power supply portion 5, the power-saving control portion 6 and the facsimile portion 7 discussed above will then be described in detail. FIG. 3 is a block diagram showing the configuration of a main potion of the multi-function peripheral 100. In FIG. 3, the direction in which power is supplied is indicated by white arrows framed by black lines.

Within the main body control portion 4, a CPU 41 that serves as a central processing unit, a ROM 42 that stores data and programs for performing control, a RAM 43 and a HDD (hard disk device) 44 that temporarily store data, programs, image data, conditions set through the operation panel 1 and the like, an image processing portion 45 that performs image processing such as a change in density and enlargement/reduction on image data, an I/F (interface) portion 46 for transmitting and receiving data with the facsimile portion 7 and an I/F portion 47 for transmitting and receiving data with the power-saving control portion 6 are provided.

The image data received through the telephone line 400 in the facsimile portion 7 is captured into the main body control portion 4 through the I/F portion 46, the image data received through the network 200 in the power-saving control portion 6 is captured into the main body control portion 4 through the I/F portion 47 and they are stored in the RAM 43 or the HDD 44. Then, image processing is performed as necessary in the image processing portion 45, is thereafter fed out to the image formation mechanism 3 and is printed as an image therein.

Within the power supply portion 5, a power-saving power control portion 51 and a normal power control portion 52 are provided. In the power-saving mode, the power-saving power control portion 51 supplies power only to the line control portion 71 of the facsimile portion 7 to be described later and the power-saving control portion 6, and stops the supply of power to the other portions. In other words, in the power-saving mode, the supply of power to the facsimile portion 7 is stopped except the line control portion 71. The normal power control portion 52 is operated in the normal mode, and supplies power to the individual portions including the facsimile portion 7 within the multi-function peripheral 100. In the off mode, the power supply portion 5 also stops the supply of power by the power-saving power control portion 51, that is, the supply of power to the facsimile portion 7 including the line control portion 71 and the power-saving control portion 6.

Within the power-saving control portion 6, a CPU 61 is provided that controls the supply of power by the power supply portion 5 (the power-saving power control portion 51 and the normal power control portion 52) and that serves as a central processing unit. Within the power-saving control portion 6, a ROM/RAM 62 which stores programs, data and the like for power-saving control and network control, a MAC portion 63 for monitoring the specific protocol from the network 200 and feeding out maintenance information and the status information on the multi-function peripheral 100 to the network 200, an I/F portion 64 for transmitting and receiving data with the main body control portion 4 and an I/O portion 65 to which a detection signal (incoming call detection signal) of a call signal transmitted from the line control portion 71 of the facsimile portion 7 are also provided.

When in the power-saving mode, the I/O portion 65 receives the detection signal, the CPU 61 controls the normal power control portion 52 of the power supply portion 5 to transfer the power supply mode to the normal mode. In this way, in the power-saving mode, only the line control portion 71 necessary to detect the reception of the call signal in the facsimile portion 7 is operated, and thus power consumption in the facsimile portion 7 is minimized, and after the reception of the call signal, the mode is returned to the normal mode, and thus it is possible to perform, on data received through the telephone line 400, image processing in an image processing portion 75 to be described later and to perform the image formation operation in the image formation mechanism 3 based on the data after the image processing.

Within the power-saving control portion 6, a time measurement portion 66 is provided, and thus it is possible to measure various times with the time measurement portion 66. For example, various times such as a time elapsed since the completion of the image formation operation by the image formation mechanism 3 and a time elapsed since the detection of disconnection from the telephone line 400 by a CPU 72 to be described later can be measured with the time measurement portion 66. The time measured by the time measurement portion 66 is, for example, reset by the CPU 61 when the image formation operation is subsequently started.

In the facsimile portion 7, the line control portion 71, the CPU 72 serving as a central processing unit, a ROM/RAM 73 which stores data, programs and the like for control, a NVRAM (nonvolatile RAM) 74 for image accumulation, the image processing portion 75 which performs the image processing on the image data, a MODEM 76 for connection to the telephone line 400 and an I/F portion 77 for transmitting and receiving data with the main body control portion 4 are provided.

The line control portion 71 is a NCU (Network Control Unit) that is connected to the telephone line 400 and that detects a line voltage applied to the telephone line 400. A predetermined direct-current voltage (for example, about 42 to 53V) is applied to the telephone line 400 by the switching station 600. The line control portion 71 detects this voltage as the line voltage. When the line control portion 71 detects the call signal from the telephone line 400, the line control portion 71 outputs the detection signal (incoming call detection signal) to the power-saving control portion 6. In this way, as described above, the power-saving control portion 6 performs control on the return to the normal mode, and thus it is possible to perform image formation based on the image data received through the telephone line 400.

In the power-saving mode, as described above, since power is supplied to the line control portion 71, the line control portion 71 detects the call signal from the telephone line 400, and thus it is possible to return to the normal mode as described above. However, in the off mode, since the supply of power to the line control portion 71 is stopped, the call signal cannot be detected, and thus it is impossible to return to the normal mode based on the detection of the call signal. Hence, it can also be said that the power-saving mode is a mode in which it is possible to return to the normal mode by the incoming call from the telephone line 400 and that the off mode is a mode in which the function is stopped such that the return to the normal mode by the incoming call cannot be performed and in which lower power consumption is achieved as compared with the power-saving mode.

The CPU 72 is a connection state determination portion that determines, based on the line voltage applied to the telephone line 400, that is, the line voltage detected by the line control portion 71, the state of connection between the telephone line 400 and the facsimile portion 7. For example, when the line control portion 71 detects 0V as the line voltage, the CPU 72 can determine that the connection between the multi-function peripheral 100 (the facsimile portion 7) and the telephone line 400 is disconnected whereas when the line control portion 71 detects 40V or more as the line voltage, the CPU 72 can determine that the connection to the telephone line 400 is maintained. As the state where the connection to the telephone line 400 is disconnected, an event where a modular line connected to the telephone line 400 is disconnected from the multi-function peripheral 100 (the facsimile portion 7) can be assumed, and moreover, a temporary power failure (hereinafter collectively referred to as a "power failure in a switching station or the like") in the switching station 600 connected to the telephone line 400 and in a private branch exchange 120 (see FIG. 7) installed within the same building as in the multi-function peripheral 100 can be assumed. Although a modular line disconnection occurs based on the intension of a user to disconnect the modular line, a power failure in a switching station or the like occurs regardless of the intention of the user.

As described above, in the normal mode, since power is supplied to the entire facsimile portion 7, the CPU 72 can determine, based on the line voltage, the state of connection to the telephone line 400. However, in the power-saving mode, since the supply of power to the facsimile portion 7 is stopped except the line control portion 71, it is impossible to operate the CPU 72, and thus the determination described above cannot be made.

On the other hand, when the facsimile portion 7 is not connected to the telephone line 400, as described above, in terms of tightening of environmental regulation, it is required to transfer from the power-saving mode to a mode in which power consumption is lower. In order to cope with this requirement, in the power-saving mode, it is necessary to periodically return to the normal mode to periodically operate the CPU 72 and thereby determine the state of connection to the telephone line 400.

However in a case where in the normal mode, the CPU 72 determines that the connection to the telephone line 400 is disconnected, and the mode is transferred to the off mode without exception (regardless of whether or not the disconnection is caused by the intention of the user), when the disconnection is caused regardless of the intention of the user such as by a power failure in a switching station or the like, after the recovery from the power failure, the multi-function peripheral 100 (in particular, the facsimile portion 7) and the external telephone 500 cannot be utilized (since the facsimile portion 7 is in the off mode), with the result that the convenience of the user is reduced.

Hence, in the present embodiment, when the connection to the telephone line 400 is disconnected, the transfer to the off mode is controlled by appropriately determining whether or not the line disconnection is caused by a power failure in a switching station or the like, based on whether or not a notification of information for making a determination as to whether or not the transfer to the off mode is needed is provided from an information output device provided outside the multi-function peripheral 100. When the transfer to the off mode is controlled based on the notification of information from the information output device, an assumption is made that a system is established in which the multi-function peripheral 100 is connected to the information output device through the network so as to allow communication therebetween. In the following discussion, with the description of such a system being given, the control on the transfer to the off mode in the present embodiment will be described.

(Control on Transfer to the Off Mode (No. 1))

Figure 4:
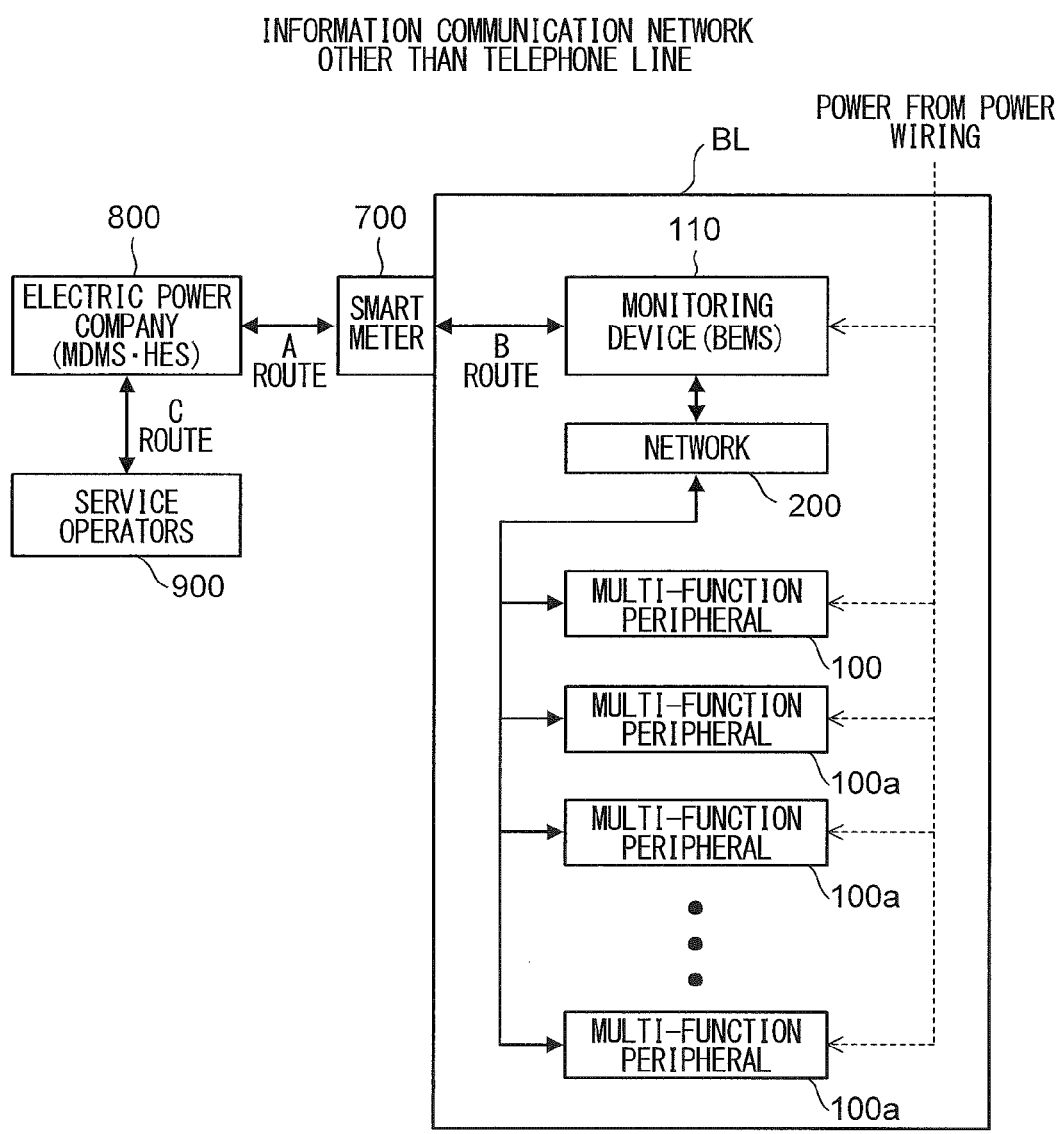
FIG. 4 is a block diagram showing an example of an information communication network to which the multi-function peripheral is applied.

FIG. 4 is a block diagram showing an example of an information communication network that performs communication of information through a communication line other than the telephone line 400. In the figure, the communication path of information is indicated by the arrows of solid lines, and the supply path of power is indicated by the arrows of broken lines (the same is true in the other drawings). The multi-function peripheral 100 of the present embodiment is installed within the same building BL (for example, a building) together with at least one multi-function peripheral 100a serving as the information output device. The multi-function peripheral 100a is another image forming apparatus other than the multi-function peripheral 100 of the present embodiment, and can perform facsimile communication.

The multi-function peripheral 100a may have the same configuration as the multi-function peripheral 100 or may have a configuration different from the multi-function peripheral 100 (however, the multi-function peripheral 100a has a facsimile function). These multi-function peripherals 100 and 100a are connected through the network 200 to a monitoring device 110.

The monitoring device 110 communicates with the multi-function peripherals 100 and 100a through the network 200 to monitor the state of the supply of power from a power wiring to the multi-function peripherals 100 and 100a. The monitoring device 110 described above can be formed with an existing BEMS (Building Energy Management System) that monitors and controls the used amount of power in power distribution facilities, air conditioning facilities, lighting facilities, ventilation facilities, OA appliances and the like within the building and that is an energy management system within the building.

The monitoring device 110 is connected through a smart meter 700 to an electric power company 800 such that the monitoring device 110 can communicate with the electric power company 800, and the electric power company 800 is connected to a plurality of service operators 900 such that the electric power company 800 can communicate with the service operators 900.

The smart meter 700 sums, every predetermined time (for example, 30 minutes), the used amount of power in individual devices managed by the monitoring device 110 within the building BL, and transmits the information thereof through the communication line to the electric power company 800. The smart meter 700 transmits the information on the used amount of power that is summed, a current value, a time and the like to the monitoring device 110 and performs, based on an instruction from the electric power company 800, the supply or the stop (remote connection and disconnection) of power to the building BL according to the conditions of the contract of a contractor.

In the electric power company 800, an information collection device (HES; Head End System) that collects the information transmitted from the smart meter 700 and an information management device (MDMS; Meter Data Management System) that manages, for each contractor, the information collected by the information collection device are provided. The electric power company 800 instructs, according to the conditions of the contract of the contractor, the smart meter 700 to perform the supply or the stop of power to the building BL.

The service operator 900 is a third party other than the electric power company that acquires, from the electric power company 800, data managed in the MDMS to utilize it for the provision of a new service (for example, a power-saving service) or the like. Information acquired by the provision of the new service in the service operator 900 is fed back to the electric power company 800.

An information communication path between the smart meter 700 and the electric power company 800 is referred to as an A route, an information communication path between the smart meter 700 and the monitoring device 110 is referred to as a B route and an information communication path between the electric power company 800 and the service operator 900 is referred to as a C route.

Although here, the monitoring device 110 is formed with the BEMS, the monitoring device 110 can be formed with a management system corresponding to the environment in which the multi-function peripheral 100 is installed. For example, when the environment in which the multi-function peripheral 100 is installed is an individual home, the monitoring device 110 can be formed with a HEMS (Home Energy Management System) that is an energy management system within a home. When the environment in which the multi-function peripheral 100 is installed is a factory, the monitoring device 110 can be formed with a FEMS (Factory Energy Management System) that is an energy management system within a factory. Furthermore, when the environment in which the multi-function peripheral 100 is installed is considered to be a community, the monitoring device 110 can be formed with a CEMS (Cluster/Community Energy Management System) that is an energy management system within a community.

Figure 5:
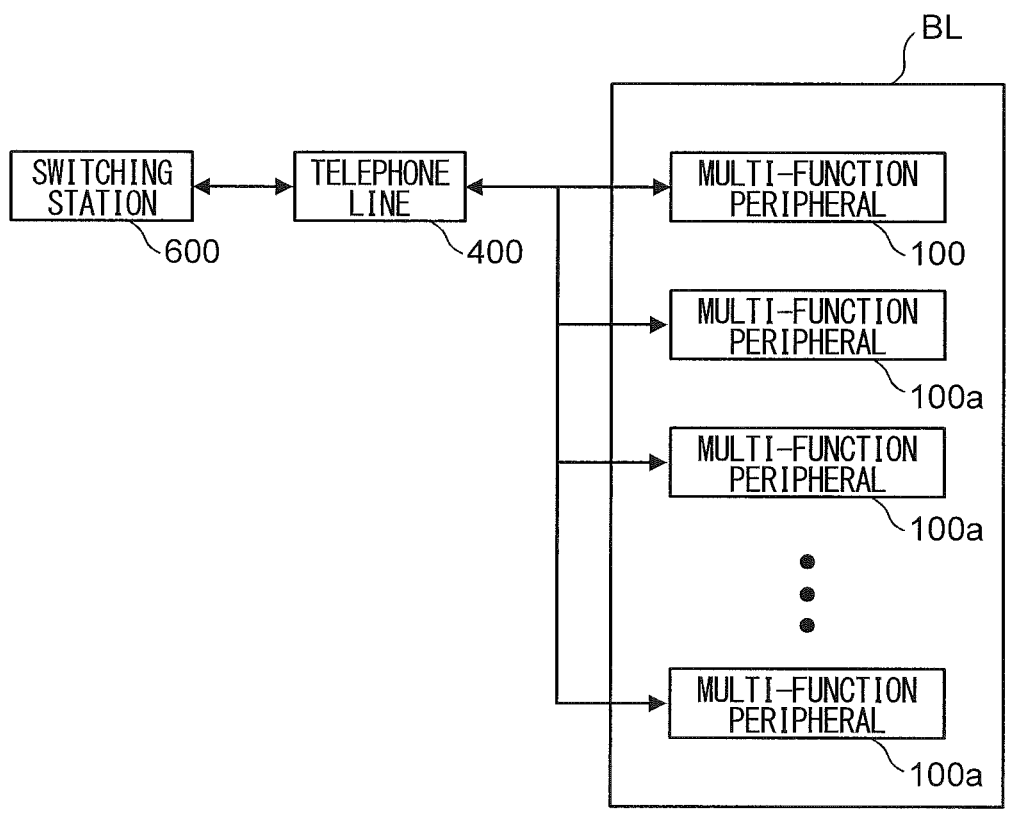
FIG. 5 is a block diagram showing an example of a line communication network to which the multi-function peripheral is applied.

FIG. 5 is a block diagram showing an example of a line communication network in which facsimile communication is performed through the telephone line 400. As shown in the figure, the multi-function peripherals 100 and 100*a* within the same building BL are directly connected to the telephone line 400 without the intervention of the private branch exchange 120 (see FIG. 7 and the like) which will be described later.

The control on the transfer of the power supply mode in the present embodiment will then be described. In order for the normal mode in which the facsimile portion 7 can perform facsimile communication (the transmission and reception of data) to be distinguished, in the following description, from the normal mode to which in the power-saving mode, the power supply mode is periodically returned so that whether or not the transfer to the off mode is needed is determined, the latter normal mode is referred to as a temporary return mode for convenience. Hence, the power supply modes controlled by the power-saving control portion 6 include: the normal mode in which power is supplied to the facsimile portion 7 (including the line control portion 71 and the CPU 72); the power-saving mode in which power is supplied to part (for example, the line control portion 71) of the facsimile portion 7 whereas the supply of power to the remaining of the facsimile portion 7 (for example, the CPU 72) is stopped; the off mode in which the supply of power to the entire facsimile portion 7 including the line control portion 71 and the CPU 72 is stopped; and the temporary return mode in which in the power-saving mode, the power supply mode is periodically returned to the normal mode so that whether or not the transfer to the off mode is needed is determined.

Figure 6:
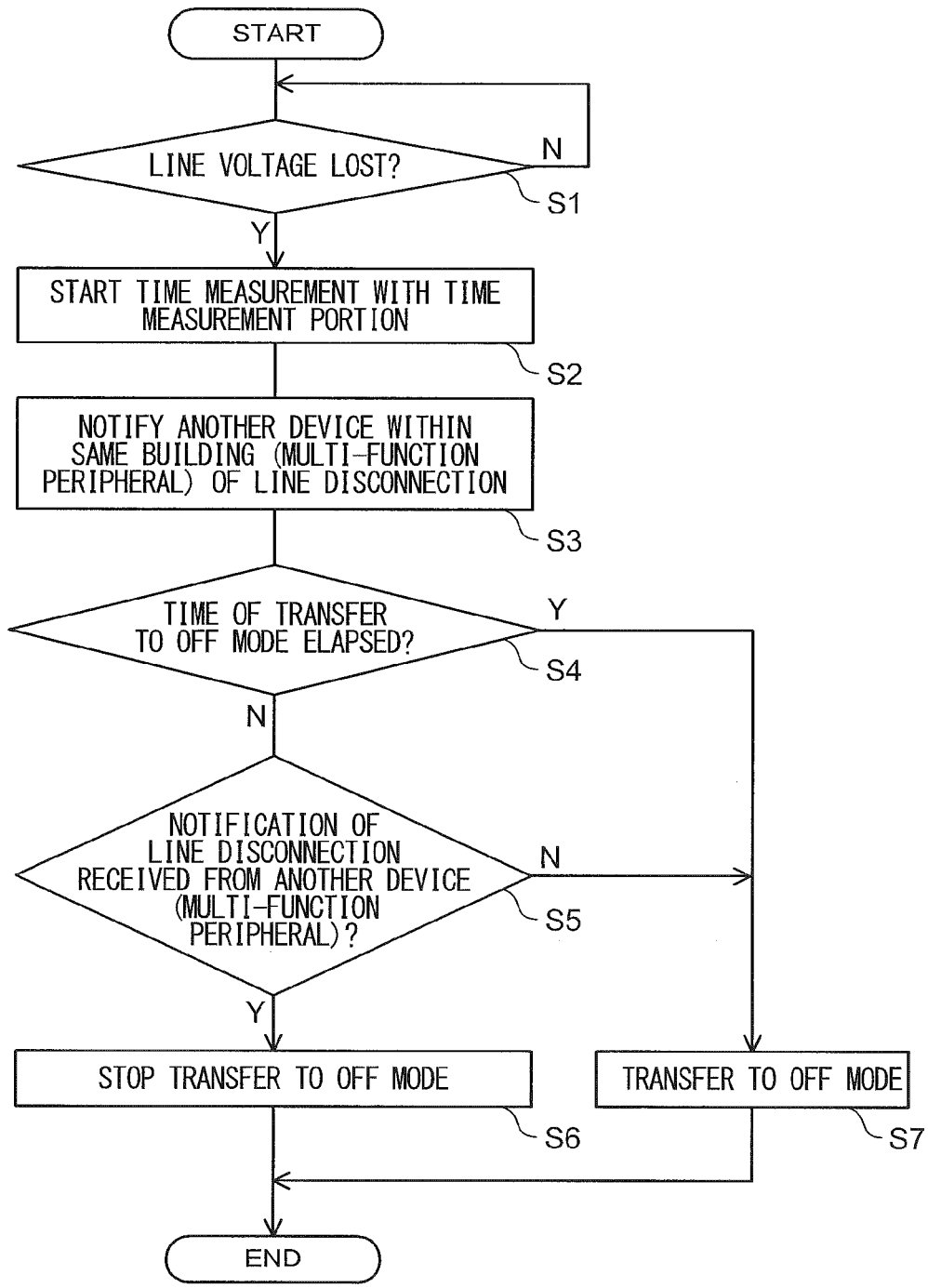
FIG. 6 is a flowchart showing the flow of processing by control on transfer to an off mode.

FIG. 6 is a flowchart showing an example of the flow of processing by control on the transfer to the off mode in the present embodiment. In the normal mode or the temporary return mode, the CPU 72 determines, based on the line voltage detected in the line control portion 71 of the facsimile portion 7, whether or not the connection to the telephone line 400 is disconnected (whether or not the line voltage is lost) (S1). When in S1, it is determined that the connection to the telephone line 400 is disconnected, the time measurement portion 66 of the power-saving control portion 6 starts the time measurement to measure a time elapsed since the determination of the line disconnection (S2). Thereafter, the CPU 61 of the power-saving control portion 6 notifies, through the network 200, the information that the connection to the telephone line 400 is disconnected to another image forming apparatus (the multi-function peripheral 100*a*) within the same building BL (S3).

Then, the CPU 61 determines, before a time of the transfer to the off mode has elapsed, that is, before the time measured by the time measurement portion 66 reaches a time (which is assumed to be previously set through the operation panel 1) when the transfer to the off mode is started (S4), whether or not the information that the connection to the telephone line 400 is disconnected is notified by another multi-function peripheral 100*a* within the same building BL through the network 200 to the own multi-function peripheral (the multi-function peripheral 100) (S5). When a notification of the line disconnection is provided from another multi-function peripheral 100*a* before the time of the transfer to the off mode has elapsed, since the line disconnection is detected both by the own multi-function peripheral and another multi-function peripheral 100*a*, it can be considered that the line disconnection occurs without the intention of the user as in a power failure in the switching station 600. In this case, in order to prepare for the recovery from the power failure in the switching station 600, the CPU 61 stops the transfer to the off mode (S6), maintains the normal mode or the power-saving mode and completes a series of processing steps.

On the other hand, when in S4, the time of the transfer to the off mode has elapsed or when even before the time of the transfer to the off mode has elapsed, in S5, no notification of the line disconnection is provided from another multi-function peripheral 100*a*, since the line disconnection is detected only by the own multi-function peripheral, it can be considered that the line disconnection occurs such as by a modular line disconnection on the own multi-function peripheral with the intention of the user. In this case, since even when the mode is transferred to the off mode, the convenience of the user is not reduced, the CPU 61 transfers the power supply mode to the off mode (S7) and completes a series of processing steps.

As described above, within the same building BL, the multi-function peripheral 100 is connected to at least another image forming apparatus (the multi-function peripheral 100*a*) serving as the information output device through the network 200 which is a communication line other than the telephone line 400. Then, in a case where the CPU 72 of the facsimile portion 7 determines that the connection to the telephone line 400 is disconnected (S1), when another multi-function peripheral 100*a* notifies the multi-function peripheral 100 of the information indicating that the connection to the telephone line 400 is disconnected, the power-saving control portion 6 (the CPU 61) stops the transfer to the off mode (S5 and S6). As described above, when the line disconnection is detected both by the multi-function peripherals 100 and 100*a*, since the line disconnection is determined to be caused by a power failure in the switching station 600, the transfer to the off mode is stopped, and thus it is possible to avoid an event in which after the recovery from the power failure in the switching station 600, it is impossible to perform facsimile communication in the facsimile portion 7.

When a notification of information from another multi-function peripheral 100*a* is not provided through the network 200 within a predetermined time after the CPU 72 determines that the connection to the telephone line 400 is disconnected, the power-saving control portion 6 transfers the power supply mode to the off mode (S4, S5 and S7). When the line disconnection is detected in the multi-function peripheral 100, and a notification of information from another multi-function peripheral 100*a* is not provided, since the line disconnection is detected only by the own multi-function peripheral (the multi-function peripheral 100), the line disconnection can be determined to be caused by the intention of the user (the modular line disconnection in the own multi-function peripheral). In this case, the power supply mode is transferred to the off mode, and thus power saving is performed, with the result that it is possible to cope with the requirement of the environmental regulation.

When the CPU 72 determines that the connection to the telephone line 400 is disconnected (S1), the power-saving control portion 6 notifies another multi-function peripheral 100*a* of the information indicating that the connection to the telephone line 400 is disconnected (S3). In this way, even in another multi-function peripheral 100*a*, as in the own multi-function peripheral, it is possible to determine whether or not the line disconnection is caused by a power failure in the switching station 600, and it is possible to transfer to the off mode or to stop the transfer according to the result thereof.

(Control on Transfer to the Off Mode (No. 2))

Figure 7:
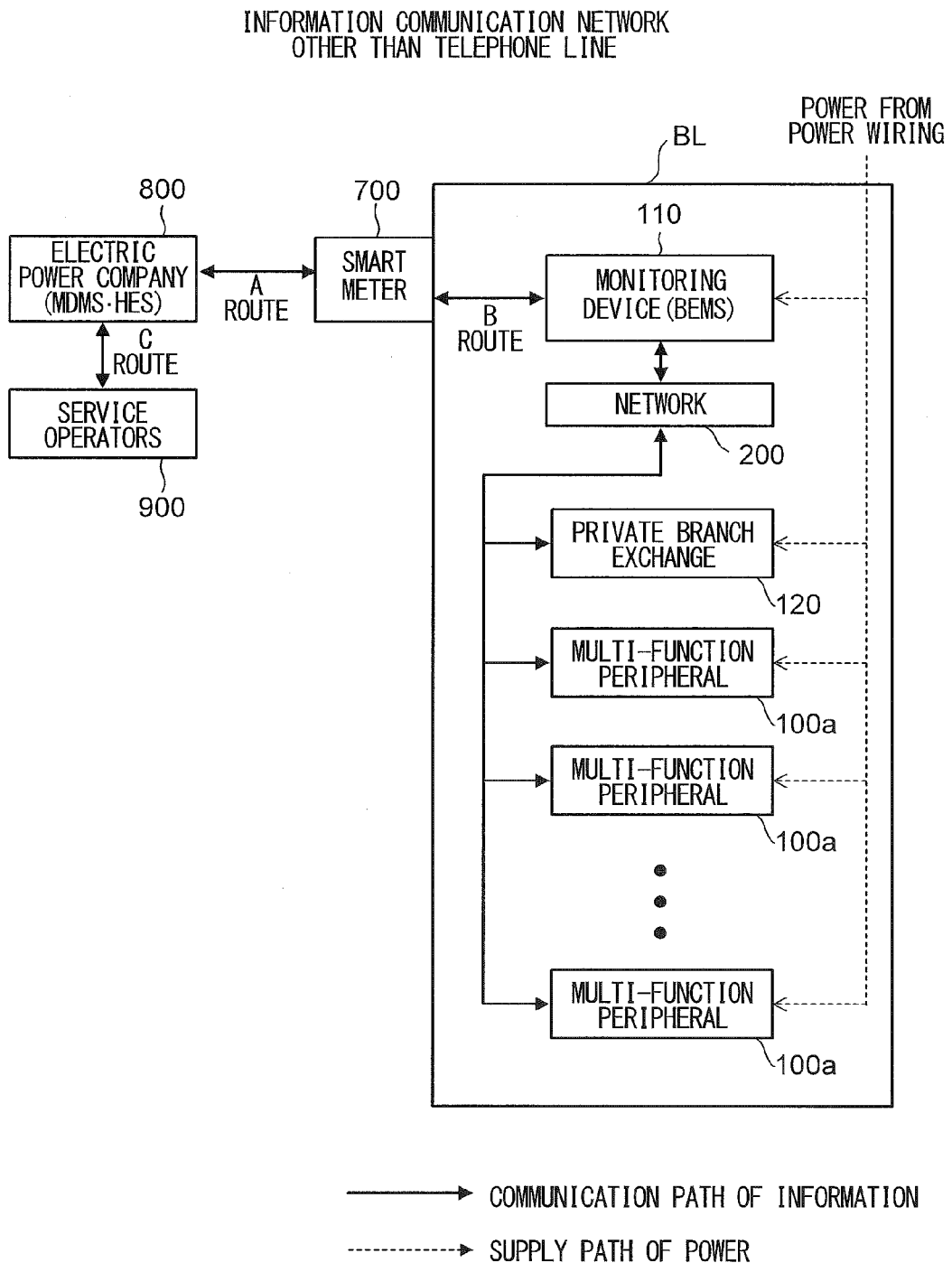
FIG. 7 is a block diagram showing another example of the information communication network.
Figure 8:
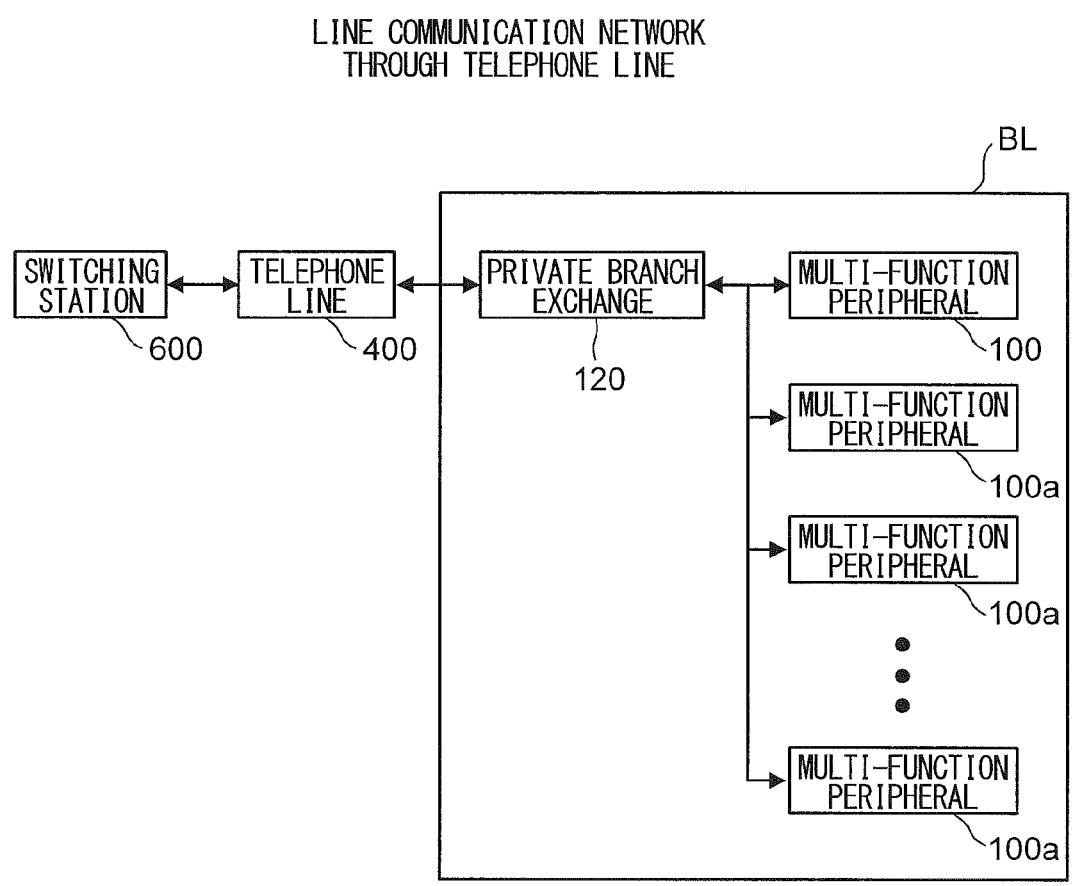
FIG. 8 is a block diagram showing another example of the line communication network.

FIG. 7 is a block diagram showing another example of the information communication network, and FIG. 8 is a block diagram showing another example of the line communication network. In this example, the multi-function peripherals 100 and 100*a* are connected to the telephone line 400 through the private branch exchange 120 installed within the same building BL (see FIG. 8). Within the building BL, not only the multi-function peripherals 100 and 100*a* but also the private branch exchange 120 is connected through the network 200 to the monitoring device 110 within the building BL such that they can communicate with the monitoring device 110 (see FIG. 7). Within the building BL, the private branch exchange 120 switches the image forming apparatuses (the multi-function peripherals 100 and 100*a*) so as to connect to the telephone line 400.

The monitoring device 110 communicates with the multi-function peripherals 100 and 100*a* and the private branch exchange 120 through the network 200, and thereby monitors the state of the supply of power to the multi-function peripherals 100 and 100*a* and the private branch exchange 120 in electrical wiring facilities (EPS; Electric Pipe Space) within the building BL and functions as an internal monitoring device that monitors whether or not a power failure occurs in them. For example, when the communication of information between the monitoring device 110 and the private branch exchange 120 is interrupted, the monitoring device 110 can determine that power is not supplied to the private branch exchange 120 and that a power failure occurs in the private branch exchange 120.

Figure 9:
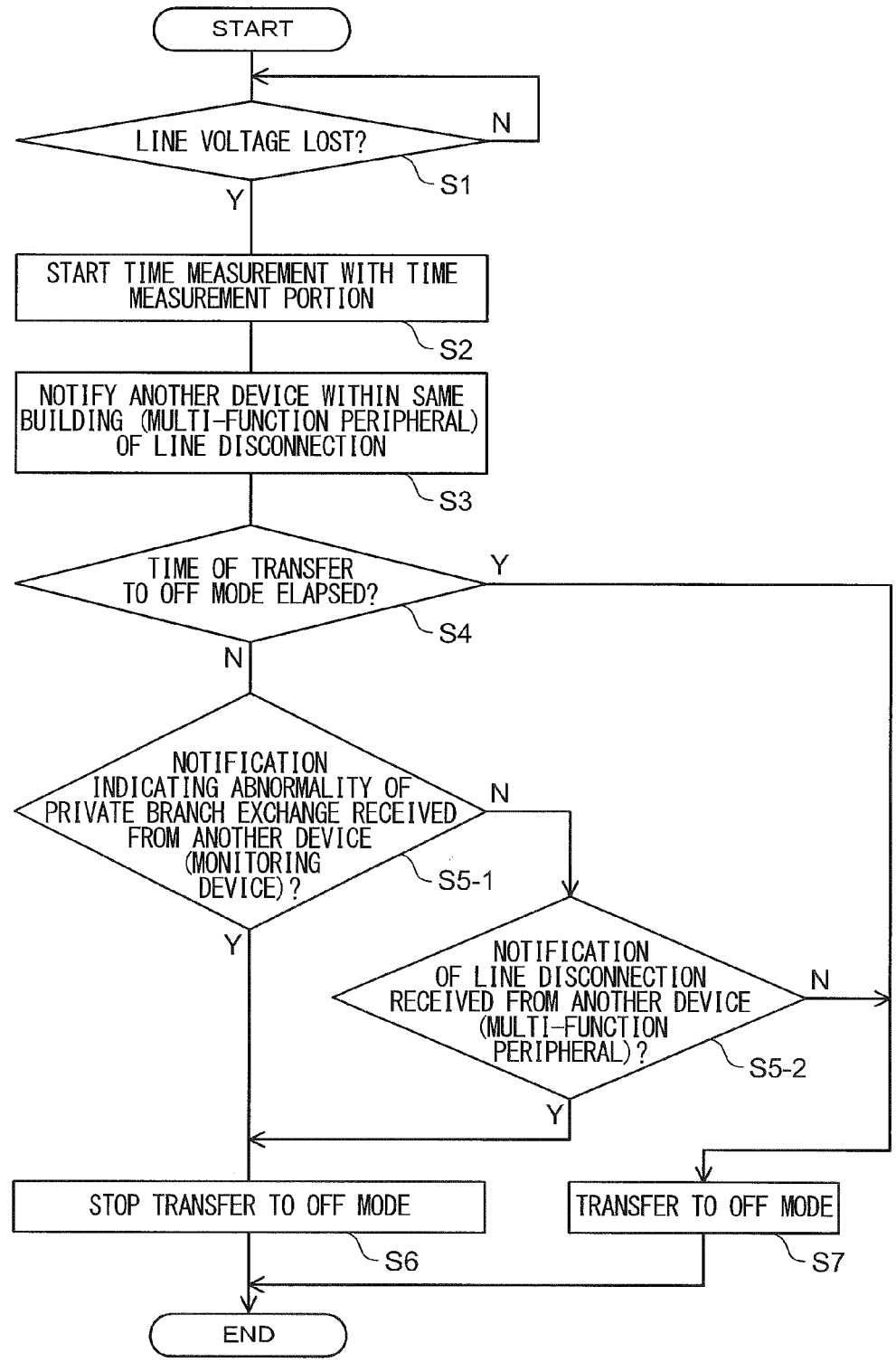
FIG. 9 is a flowchart showing the flow of processing by another control on transfer to the off mode.

FIG. 9 is a flowchart showing the flow of processing by another control on transfer to the off mode in the present embodiment. This example is the same as in FIG. 6 except that the step of S5 in FIG. 6 is replaced with S5-1 and S5-2. Only parts different from the processing of FIG. 6 will be described below.

In S4, the CPU 61 of the power-saving control portion 6 determines, before the time of the transfer to the off mode has elapsed, whether or not the information indicating a power failure (abnormality) in the private branch exchange 120 is notified by the monitoring device 110 within the same building BL to the multi-function peripheral 100 through the network 200 (S5-1). When the information indicating an abnormality in the private branch exchange 120 is notified, since it can be considered that the line disconnection in S1 is caused by a power failure in the private branch exchange 120, the CPU 61 stops the transfer to the off mode so as to prepare for the recovery from the power failure within the private branch exchange 120. (S6).

When in S5-1, the information indicating an abnormality in the private branch exchange 120 is not notified to the multi-function peripheral 100, the CPU 61 determines whether or not another multi-function peripheral 100*a* within the same building BL notifies the information that the connection to the telephone line 400 is disconnected to the own multi-function peripheral (the multi-function peripheral 100) through the network 200 (S5-2). When the multi-function peripheral 100*a* provides the notification of the line disconnection, since it can be considered that the line disconnection is caused not by a power failure in the private branch exchange 120 but by a power failure in the switching station 600, the CPU 61 stops the transfer to the off mode so as to prepare for the recovery from the power failure within the switching station 600. (S6). In a case where the multi-function peripheral 100*a* is not present within the building BL, when in S5-1, no notification is provided to the multi-function peripheral 100, S5-2 is skipped, and the process is preferably transferred to S7 without being processed.

On the other hand, even in a case where in S4, the time of the transfer to the off mode has elapsed or even in a case where in S4, the time of the transfer has not elapsed, when in S5-2, the multi-function peripheral 100*a* does not provide the notification of the line disconnection, since it can be considered that the line disconnection is caused by a modular line disconnection, the CPU 61 transfers the power supply mode to the off mode (S7).

As described above, in a case where the CPU 72 of the facsimile portion 7 determines that the connection to the telephone line 400 is disconnected (S1), when the information indicating that a power failure occurs in the private branch exchange 120 within the same building BL is notified through the network 200 by the monitoring device 110 to the multi-function peripheral 100, the power-saving control portion 6 (the CPU 61) stops the transfer to the off mode (S5-1 and S6). When the line disconnection is detected in the multi-function peripheral 100, and the monitoring device 110 notifies the information indicating an abnormality in the private branch exchange 120, it can be determined that the line disconnection is caused by a power failure in the private branch exchange 120. Hence, in this case, the transfer to the off mode is stopped, and thus it is possible to avoid an event that, after the recovery from the power failure in the private branch exchange 120, it is impossible to perform facsimile communication in the facsimile portion 7.

When a notification of information from the monitoring device 110 serving as the information output device or the multi-function peripheral 100*a* is not provided through the network 200 within a predetermined time after the CPU 72 determines that the connection to the telephone line 400 is disconnected, the power-saving control portion 6 transfers the power supply mode to the off mode (S4, S5-1, S5-2 and S7). When the line disconnection is detected in the multi-function peripheral 100, and no notification of information from the information output device is provided, it can be determined that the line disconnection is caused by a modular line disconnection in the own multi-function peripheral (the multi-function peripheral 100). Hence, in this case, the power supply mode is transferred to the off mode, and thus power saving can be performed.

(Control on Transfer to the Off Mode (No. 3))

Figure 10:
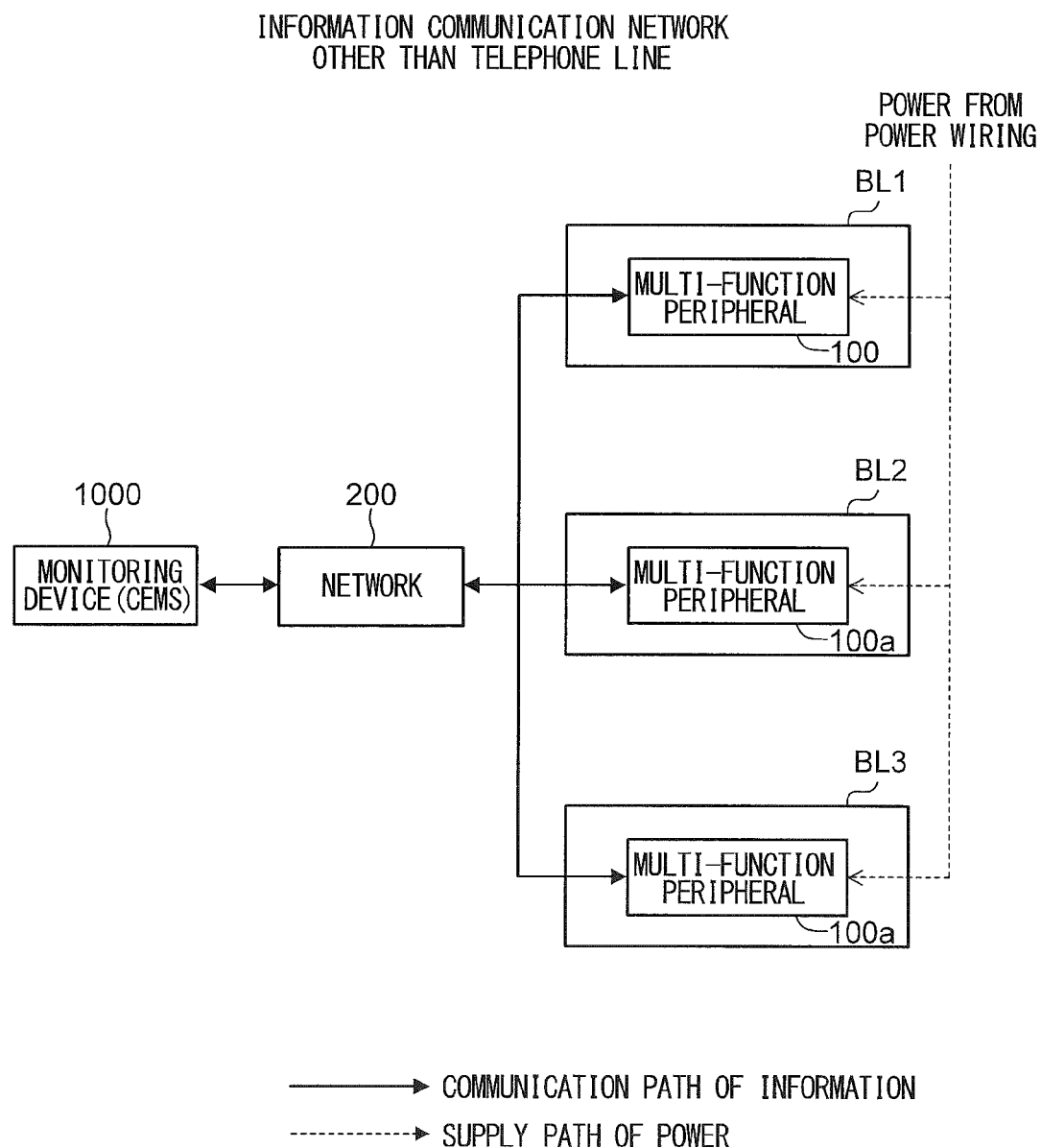
FIG. 10 is a block diagram showing yet another example of the information communication network.
Figure 11:
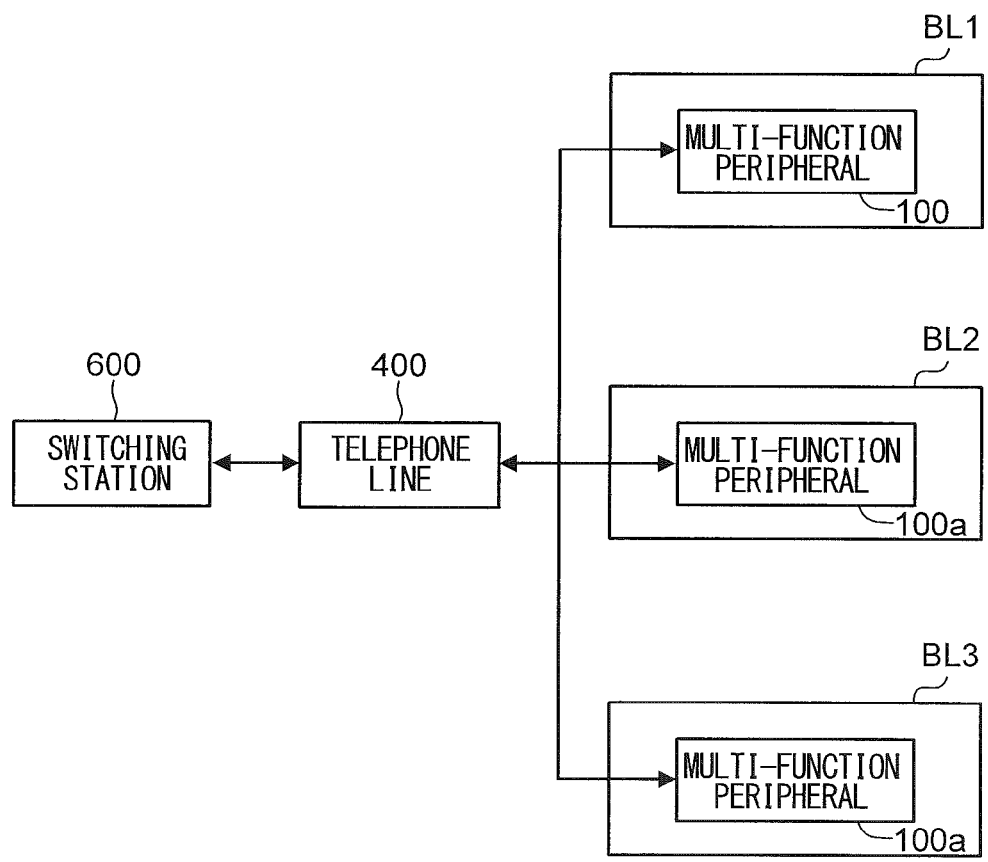
FIG. 11 is a block diagram showing yet another example of the line communication network.

FIG. 10 is a block diagram showing another example of the information communication network, and FIG. 11 is a block diagram showing another example of the line communication network. In this example, a plurality of buildings where the multi-function peripheral is installed are present. The state of the supply of power in an area including the buildings is monitored by a monitoring device 1000.

In FIG. 10, as an example, it is assumed that a plurality of buildings are three buildings, that is, a building BL1 where the multi-function peripheral 100 of the present embodiment is installed and buildings BL2 and BL3 where the multi-function peripheral 100*a* serving as another image forming apparatus is installed. The multi-function peripherals 100 and 100*a* within the buildings BL1 to BL3 are connected through the network 200 (for example, the Internet) to the monitoring device 1000 such that they can communicate with the monitoring device 1000. The monitoring device 1000 communicates with the multi-function peripherals within the buildings through the network 200 to function as an external monitoring device that monitors the state of the supply of power from a power wiring to the multi-function peripherals within the buildings. The monitoring device 1000 can be formed with the CEMS which is an energy management system within the area. As shown in FIG. 11, the multi-function peripheral 100 within the building BL1 and the multi-function peripherals 100a within the buildings BL2 and BL3 are connected to the telephone line 400.

Incidentally, in a case where a power failure occurs in the entire area including a plurality of buildings and thereafter the area is recovered from the power failure, even when the supply of power to the buildings is restarted, if the recovery from a power failure in an area where the switching station 600 is present is delayed or the recovery from a power failure itself in the switching station 600 is delayed though the switching station 600 is present in the same area where a plurality of buildings are present, the line voltage is not applied to the telephone line 400, and the multi-function peripheral 100 detects the line disconnection. When under such conditions, the mode is immediately transferred to the off mode, and thereafter the switching station 600 is recovered from the power failure, it is impossible to perform facsimile communication in the multi-function peripheral 100.

Hence, when the area where the building BL1 including the multi-function peripheral 100 is present is recovered from the power failure, with the assumption that the recovery from the power failure in the switching station 600 may be delayed, the monitoring device 1000 provides a notification to the multi-function peripheral 100 that the transfer to the off mode is prevented. Based on the notification, the multi-function peripheral 100 controls the transfer to the off mode. The details thereof will be described below.

Figure 12:
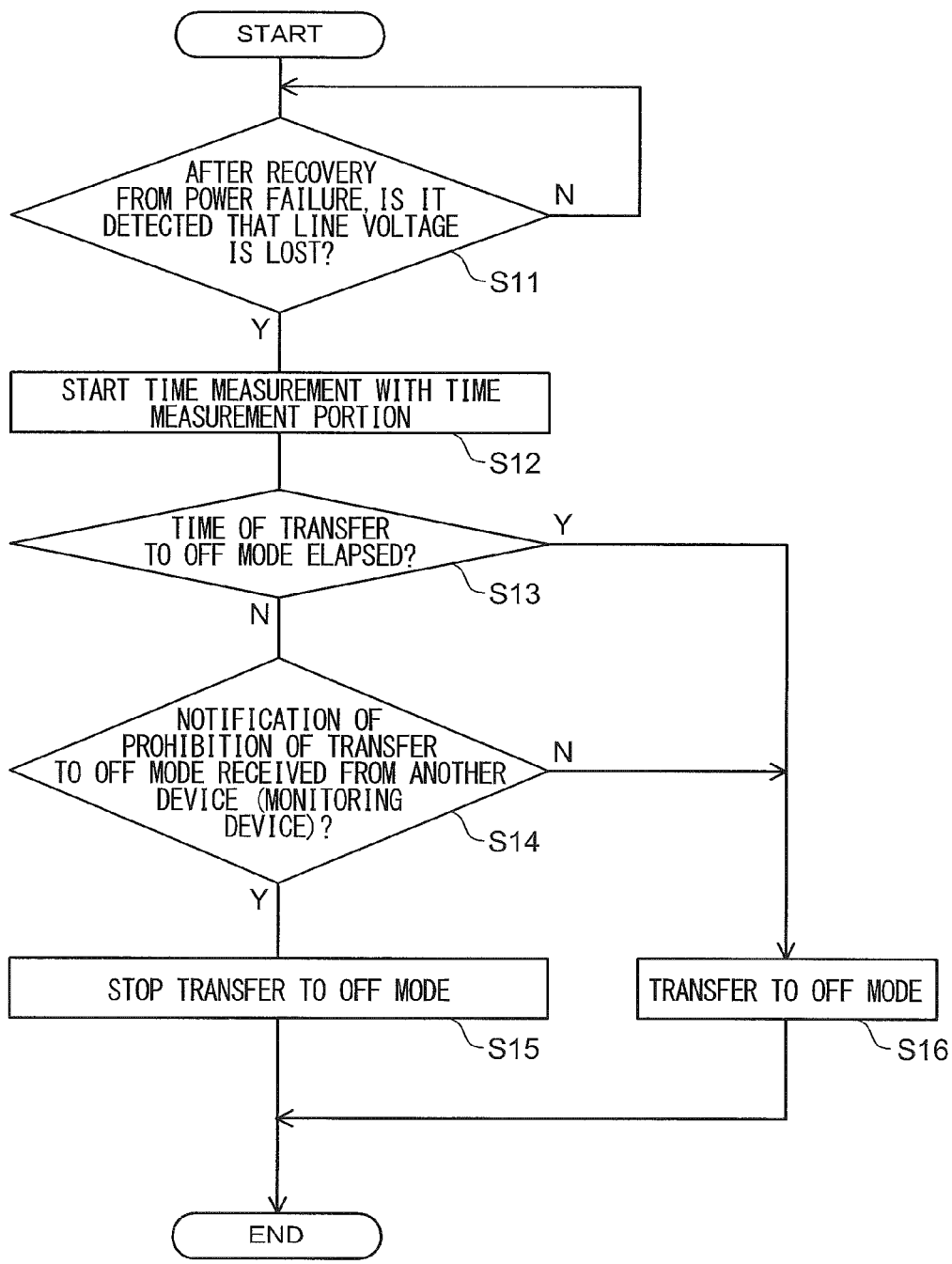
FIG. 12 is a flowchart showing the flow of processing by yet another control on transfer to the off mode.

FIG. 12 is a flowchart showing the flow of processing by yet another control on transfer to the off mode in the present embodiment. Here, a power failure occurs in the entire area for some reason, and after the recovery from the power failure, the multi-function peripheral 100 present within the building BL1 in the area starts an operation in the normal mode.

After the entire area where the buildings BL1 to BL3 are present is recovered from the power failure, the CPU 72 of the facsimile portion 7 determines, based on the line voltage detected in the line control portion 71, whether or not the connection to the telephone line 400 is disconnected (whether or not the line voltage is lost) (S11). When in S11, it is determined that the connection to the telephone line 400 is disconnected, the time measurement portion 66 of the power-saving control portion 6 starts the time measurement to measure a time elapsed since the detection of the line disconnection (S12).

Then, the CPU 61 determines, before a time of the transfer to the off mode has elapsed, that is, before the time measured by the time measurement portion 66 reaches a time when the transfer to the off mode is started (S13), whether or not a notification of prohibition of the transfer to the off mode is received from the monitoring device 1000 through the network 200 (S14). When the notification is received, the CPU 61 stops the transfer to the off mode (S15), maintains the normal mode and completes a series of processing steps. As a case where in S14, the monitoring device 1000 provides a notification of prohibition of the transfer to the off mode to the multi-function peripheral 100, for example, a case where the monitoring device 1000 monitors the state of the supply of power to the switching station 600, the area where the building BL1 is present is recovered from the power failure but the switching station 600 itself is not recovered from the power failure can be assumed.

On the other hand, when in S13, the time of the transfer to the off mode has elapsed or when even before the time of the transfer has elapsed, in S14, no notification of prohibition of the transfer to the off mode is received from the monitoring device 1000, the CPU 61 transfers the power supply mode to the off mode (S16) and completes a series of processing steps. As a case where in S14, the monitoring device 1000 does not provide a notification of prohibition of the transfer to the off mode to the multi-function peripheral 100, for example, a case where the area where the building BL1 is present is recovered from the power failure and the switching station 600 is also recovered from the power failure can be assumed.

As described above, in a case where after the building BL1 (the entire area including the building BL1) where the multi-function peripheral 100 is installed is recovered from the power failure, it is determined that the connection to the telephone line 400 is disconnected (S11), when the monitoring device 1000 outside the building BL1 notifies, through the network 200, the information providing an instruction of the prohibition of the transfer to the off mode to the multi-function peripheral 100, the power-saving control portion 6 (the CPU 61) stops the transfer to the off mode (S15). In this way, even when the building BL1 is first recovered from the power failure, and the recovery from the power failure in the switching station 600 is delayed, it is possible to avoid an event that after the recovery from the power failure in the switching station 600, it is impossible to perform facsimile communication in the multi-function peripheral 100 within the building BL1.

When within a predetermined time after it is determined that the connection to the telephone line 400 is disconnected, no notification of the information from the monitoring device 1000 is provided, the power-saving control portion 6 transfers the power supply mode to the off mode (S16). When no notification from the multi-function peripheral 100 is provided within the predetermined time, for example, it can be considered that the monitoring device 1000 determines that the switching station 600 is recovered from the power failure simultaneously with the recovery from the power failure in the entire area and that it is not necessary to prohibit the transfer to the off mode with the assumption that the recovery from the power failure in the switching station 600 is delayed. In this case, since the line disconnection in S11 is determined to be caused by a modular line disconnection from the multi-function peripheral 100, the mode is transferred to the off mode, and thus it is possible to perform power saving.

The control on the transfer to the off mode described above can be applied to a system that includes at least any one of the multi-function peripheral 100a, the monitoring device 110 (the monitoring device within the building) and the monitoring device 1000 (the monitoring device outside the building), as the information output device outside the multi-function peripheral 100 of the present embodiment, and the control can also naturally be applied to a system that includes any two thereof or all the three. In other words, the three types of control on the transfer described above can be combined as necessary.

Hence, the multi-function peripheral 100 of the present embodiment can be expressed as follows. The multi-function peripheral 100 includes: the facsimile portion 7 that transmits and receives data through the telephone line 400 with the outside; the power supply portion 5 that supplies power to the facsimile portion 7; and the power supply control portion 6 that is connected to the network 200 which is a communication line other than the telephone line 400 and that controls the power supply mode of the power supply portion 5. When the power supply mode is the normal mode, the power supply portion 5 supplies power to the facsimile portion 7 whereas when the power supply mode is the off mode, the power supply portion 5 stops the supply of power to the facsimile portion 7. The facsimile portion 7 includes the CPU 72 that determines, based on the line voltage applied to the telephone line 400, the state of connection between the telephone line 400 and the facsimile portion 7. When the CPU 72 determines that the connection to the telephone line 400 is disconnected, the power supply control portion 6 (the CPU 61) controls the transfer to the off mode based on whether or not a notification of information for making a determination as to whether or not the transfer to the off mode is needed is provided from the information output device (the multi-function peripheral 100a, the monitoring device 110 and the monitoring device 1000) connected to the multi-function peripheral 100 through the network 200. The information for making a determination includes at least any one of the information indicating that the connection to the telephone line 400 is disconnected in another image forming apparatus (the multi-function peripheral 100a), the information from the monitoring device 110 indicating that a power failure occurs in the private branch exchange 120 and the information from the monitoring device 1000 providing an instruction of the prohibition of the transfer to the off mode.

With consideration given to the information notified by another device (the information output device) when the line disconnection is detected by the own multi-function peripheral or conditions in which its information is not notified, whether or not the line disconnection is conditions caused without the intention of the user (for example, a power failure in the switching station 600 or the private branch exchange 120) or conditions caused by the intention of the user (for example, a modular line disconnection) is totally determined, and thus it is possible to appropriately control the transfer to the off mode. In this way, it is possible to obtain different effects according to the cause of the line disconnection. In other words, when it is determined that the line disconnection is not caused by the intention of the user, the transfer to the off mode is stopped, for example, the normal mode is maintained. Thus, it is possible to avoid an event in which after the recovery from the power failure, it is impossible to perform facsimile communication. On the other hand, when it is determined that the line disconnection is caused by the intention of the user, it is possible to perform power saving by the transfer to the off mode.

Hence, it can be said that in the present embodiment, the following communication system is established. Specifically, the communication system of the present embodiment includes the multi-function peripheral 100 of the present embodiment described above and the information output device (the multi-function peripheral 100a, the monitoring device 110 and the monitoring device 1000) that can output the information for making a determination as to whether or not the transfer to the off mode is needed in the multi-function peripheral 100 through the network 200 to the multi-function peripheral 100. Such a communication system is established, and thus even when the connection to the telephone line 400 is disconnected, it is possible to appropriately control the transfer to the off mode in the multi-function peripheral 100 according to the cause of the line disconnection.

Although the example where the line control portion 71 and the CPU 72 of the facsimile portion 7 are separately formed is described above, it is possible to make the line control portion 71 have the function (for example, the function of determining the state of the connection to the telephone line 400 based on the line voltage applied to the telephone line 400) of the CPU 72.

In the configuration of the present embodiment described above, the power supply control portion can appropriately determine the cause (whether or not the line disconnection is caused without the intention of the user) of the line disconnection from the state of the own multi-function peripheral in which the connection to the telephone line is disconnected and a notification of information for making a determination on the transfer to the off mode from the information output device (for example, another image forming apparatus or the monitoring device within or outside the building) or conditions in which its information is not provided, with the result that it is possible to appropriately control the transfer to the off mode. Consequently, it is possible to obtain different effects according to the cause of the line disconnection. Specifically, when the line disconnection is caused without the intention of the user (for example, a power failure in the switching station), the transfer to the off mode is stopped, and thus it is possible to avoid an event in which after the recovery from the power failure in the switching station, it is impossible to transmit and receive data. When the line disconnection is caused by the intention of the user (for example, a modular line disconnection), it is possible to perform power saving by the transfer to the off mode.

Although the embodiment of the present disclosure is described above, the scope of the present disclosure is not limited to the embodiment, and various modifications are possible without departing from the spirit of the disclosure.

What is claimed is:
1. An image forming apparatus comprising:
a facsimile portion that transmits and receives data through a telephone line with an outside;
a power supply portion that supplies power to the facsimile portion; and
a power supply control portion that is connected to a communication line other than the telephone line and that controls a power supply mode of the power supply portion,
wherein when the power supply mode is a normal mode, the power supply portion supplies power to the facsimile portion whereas when the power supply mode is an off mode, the power supply portion stops the supply of power to the facsimile portion,
the facsimile portion includes a connection state determination portion that determines, based on a line voltage applied to the telephone line, a state of connection between the telephone line and the facsimile portion, and
when the connection state determination portion determines that the connection to the telephone line is disconnected, the power supply control portion controls a transfer to the off mode based on whether or not a notification of information for making a determination as to whether or not the transfer to the off mode is needed is provided from an information output device connected to the image forming apparatus through the communication line, the facsimile portion includes a CPU as a central processing unit, a ROM/RAM for storing data or a program for control, an NVRAM for image accumulation, and a MODEM for connection to the telephone line, the power supply control portion includes a CPU as a central processing unit for controlling supply of power by the power supply portion and a ROM/RAM for storing a program and data for power-saving control or network control, the connection state determination portion is implemented by a CPU, and the power supply portion includes a rectification circuit, a step-up transformer, and a DC/DC converter, generates various types of voltages, and supplies power to the facsimile portion.

2. The image forming apparatus according to claim 1, wherein the information output device includes at least another image forming apparatus that is connected to the image forming apparatus within a same building through the communication line, and in a case where the connection state determination portion determines that the connection to the telephone line is disconnected, when the another image forming apparatus notifies information indicating that the connection to the telephone line is disconnected to the image forming apparatus, the power supply control portion stops the transfer to the off mode.

3. The image forming apparatus according to claim 2, wherein in a case where the connection state determination portion determines that the connection to the telephone line is disconnected, the power supply control portion notifies the information indicating that the connection to the telephone line is disconnected to the another image forming apparatus.

4. The image forming apparatus according to claim 1, wherein when within a predetermined time after the connection state determination portion determines that the connection to the telephone line is disconnected, the notification of the information is not provided through the communication line from the information output device, the power supply control portion transfers the power supply mode to the off mode.

5. The image forming apparatus according to claim 1, wherein the image forming apparatus is connected to the telephone line through a private branch exchange installed within a same building, the information output device includes an internal monitoring device that monitors a state of supply of power to the private branch exchange within the building, in a case where the connection state determination portion determines that the connection to the telephone line is disconnected, when the internal monitoring device notifies, through the communication line, information indicating that a power failure occurs in the private branch exchange to the image forming apparatus, the power supply control portion stops the transfer to the off mode, and the internal monitoring device is configured as one of a BEMS, which is an energy management system within a building, a HEMS, which is an energy management system within a household, a FEMS, which is an energy management system within a factory, and a CEMS, which is an energy management system within a community.

6. The image forming apparatus according to claim 5, wherein the information output device includes at least another image forming apparatus that is connected to the image forming apparatus within a same building through the communication line, and in a case where the connection state determination portion determines that the connection to the telephone line is disconnected, when the internal monitoring device does not notify the information indicating that the power failure occurs in the private branch exchange, and the another image forming apparatus notifies information indicating that the connection to the telephone line is disconnected to the image forming apparatus, the power supply control portion stops the transfer to the off mode.

7. The image forming apparatus according to claim 5, wherein when within a predetermined time after the connection state determination portion determines that the connection to the telephone line is disconnected, the notification of the information is not provided from the internal monitoring device, the power supply control portion transfers the power supply mode to the off mode.

8. The image forming apparatus according to claim 5, wherein the information output device includes at least another image forming apparatus that is connected to the image forming apparatus within a same building through the communication line, and when within a predetermined time after the connection state determination portion determines that the connection to the telephone line is disconnected, the notification of the information indicating that the power failure occurs in the private branch exchange is not provided from the internal monitoring device, and a notification of information indicating that the connection to the telephone line is disconnected is not provided from the another image forming apparatus, the power supply output device transfers the power supply mode to the off mode.

9. The image forming apparatus according to claim 1, wherein the information output device includes an external monitoring device that monitors a state of supply of power to a building in which the image forming apparatus is installed in a case where after a recovery from a power failure in the building, the connection state determination portion determines that the connection to the telephone line is disconnected, when the external monitoring device notifies, through the communication line, information providing an instruction of prohibition of the transfer to the off mode to the image forming apparatus, the power supply control portion stops the transfer to the off mode, and the external monitoring device is configured as a CEMS, which is an energy management system within a community.

10. The image forming apparatus according to claim 9, wherein when within a predetermined time after the connection state determination portion determines that the connection to the telephone line is disconnected, the notification of the information is not provided from the external monitoring device, the power supply control portion transfers the power supply mode to the off mode.

11. A communication system comprising:
an image forming apparatus; and
an information output device, wherein the image forming apparatus includes:

a facsimile portion that transmits and receives data through a telephone line with an outside;

a power supply portion that supplies power to the facsimile portion; and a power supply control portion that is connected to a communication line other than the telephone line and that controls a power supply mode of the power supply portion, when the power supply mode is a normal mode, the power supply portion supplies power to the facsimile portion whereas when the power supply mode is an off mode, the power supply portion stops the supply of power to the facsimile portion, the facsimile portion includes a connection state determination portion that determines, based on a line voltage applied to the telephone line, a state of connection between the telephone line and the facsimile portion, when the connection state determination portion determines that the connection to the telephone line is disconnected, the power supply control portion controls a transfer to the off mode based on whether or not a notification of information for making a determination as to whether or not the transfer to the off mode is needed is provided from the information output device connected to the image forming apparatus through the communication line the information output device can output, to the image forming apparatus through the communication line, the information for making a determination as to whether or not the transfer to the off mode is needed in the image forming apparatus, the facsimile portion includes a CPU as a central processing unit, a ROM/RAM for storing data or a program for control, an NVRAM for image accumulation, and a MODEM for connection to the telephone line, the power supply control portion includes a CPU as a central processing unit for controlling supply of power by the power supply portion and a ROM/RAM for storing a program and data for power-saving control or network control, the connection state determination portion is implemented by a CPU, and the power supply portion includes a rectification circuit, a step-up transformer, and a DC/DC converter, generates various types of voltages, and supplies power to the facsimile portion.

12. The communication system according to claim 11, wherein the information output device includes at least another image forming apparatus that is connected to the image forming apparatus within a same building through the communication line, and the information for making a determination includes information indicating that the connection to the telephone line is disconnected in the another image forming apparatus.

13. The communication system according to claim 11, wherein the image forming apparatus is connected to the telephone line through a private branch exchange installed within a same building, the information output device includes an internal monitoring device that monitors a state of supply of power to the private branch exchange within the building, the information for making a determination includes information from the internal monitoring device indicating that a power failure occurs in the private branch exchange, and the internal monitoring device is configured as one of a BEMS, which is an energy management system within a building, a HEMS, which is an energy management system within a household, a FEMS, which is an energy management system within a factory, and a CEMS, which is an energy management system within a community.

14. The communication system according to claim 11, wherein the information output device includes an external monitoring device that monitors a state of supply of power to a building in which the image forming apparatus is installed, the information for making a determination includes information from the external monitoring device providing an instruction of prohibition of the transfer to the off mode, and the external monitoring device is configured as a CEMS, which is an energy management system within a community.

* * * * *